June 12, 1951  C. B. MOORE  2,556,436
PNEUMATIC CONTROL APPARATUS
Filed April 7, 1948
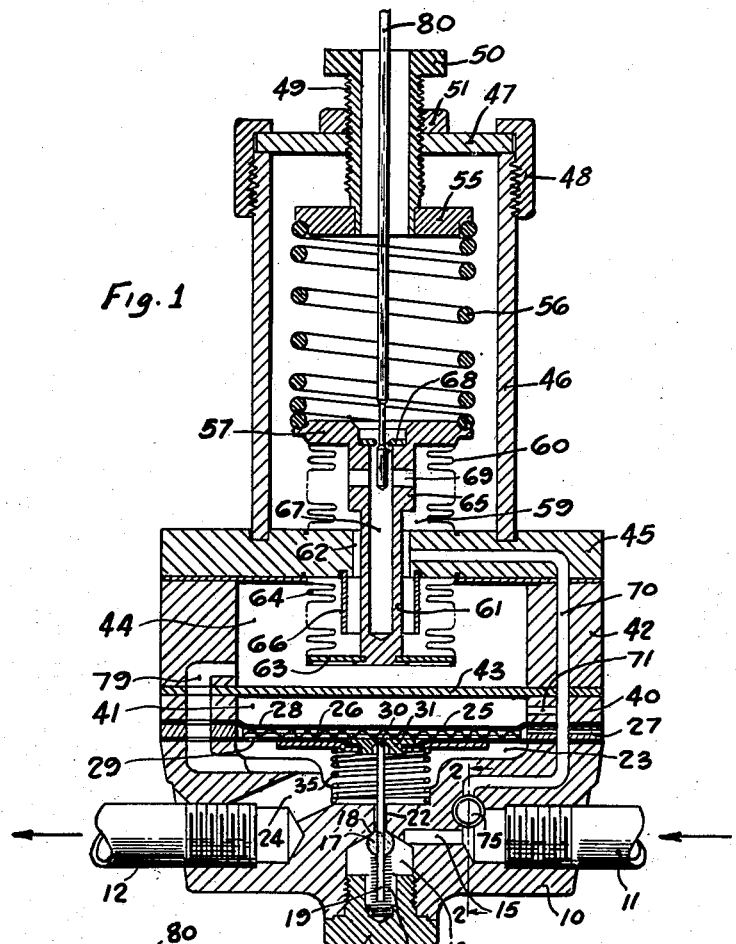
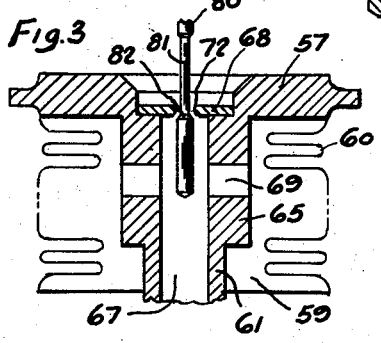
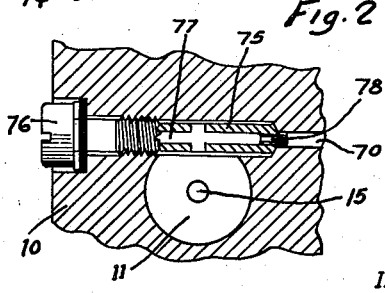
INVENTOR.
COLEMAN B. MOORE
BY
ATTORNEY.

Patented June 12, 1951

2,556,436

UNITED STATES PATENT OFFICE 2,556,436

PNEUMATIC CONTROL APPARATUS

Coleman B. Moore, Carroll Park, Pa., assignor to Moore Products Co., Philadelphia, Pa., a co-partnership Application April 7, 1948, Serial No. 19,502

9 Claims. (Cl. 137—153)

This invention relates to pneumatic control apparatus and more particularly to apparatus responsive to movement of an element for transmitting a controlled pressure.

This invention further relates to pneumatic control apparatus having a movable element, the motion of which is translated into a controlled fluid pressure, and in which the reacting force on the source of motion is exceedingly small.

This invention further relates to pneumatic control apparatus for transmitting a controlled fluid pressure as determined by the positioning of a movable element in which a large capacity of transmitted pressure fluid is provided.

This invention further relates to pneumatic control apparatus for transmitting a controlled fluid pressure having more linear transmission characteristics by reason of the pressure relationships maintained therein.

This invention further relates to pneumatic control apparatus having provisions for preventing injury to the parts thereof arising from overtravel of the movable element in either direction.

Other advantageous features will be apparent from the specification and claims.

The nature and characteristic features of the invention will be more readily understood from the following description, taken in connection with the accompanying drawings forming part hereof, in which:

Figure 1 is a vertical sectional view through a preferred embodiment of pneumatic control apparatus in accordance with the present invention, the same being partly diagrammatical;

Fig. 2 is a sectional view taken approximately on the line 2—2 of Fig. 1; and

Fig. 3 is an enlarged fragmentary sectional view illustrating certain of the details of construction.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, the pneumatic control apparatus in accordance with the present invention preferably includes a casing section 10 having a supply connection 11 in communication with a suitable source of fluid under pressure (not shown) and with a fluid delivery connection 12 for the delivery of controlled pressure fluid to a suitable instrumentality (not shown) for indication, recording or control.

The casing section 10 is provided with a chamber 13 closed by a suitable plug 14, a passageway 15 being provided in the casing section 10 between the chamber 13 and the fluid supply connection 11.

A valve is provided in the chamber 13 having a ball 17 for engagement with a seat 18, the ball 17 being mounted on a valve stem 19. A light spring 20 is provided on the valve stem 19, between the ball 17 and the plug 14, which tends to urge the ball 17 to a seated position.

The valve stem 19 extends through a fluid delivery passageway 22 formed in the casing section 10 and into, and in communication with, a chamber 23 also formed in the casing section 10.

A fluid delivery passageway 24 is also provided in the casing section 10 between the chamber 23 and the fluid delivery connection 12.

The casing section 10 is provided, across the top or upper end thereof, with a diaphragm 25, preferably of the character shown and described in my prior application for Letters Patent for Pneumatic Control Apparatus, filed December 22, 1945, Serial No. 637,057. The diaphragm 25, as disclosed in the said application, has a pervious central portion 26 and discharge connections 27 for the discharge of fluid delivered to the central portion 26 to the atmosphere. The upper wall portion 28 of the diaphragm 25 is impervious to the passage of fluid and the lower wall portion 29 of the diaphragm 25 is also impervious to the passage of fluid but is provided with a central inlet port 30 which is controlled by the upper end of the valve stem 19. The port 30 is provided in a diaphragm plate 31 in engagement with the lower wall portion 29 of the diaphragm member 25, and a spring 35 is interposed in the chamber 23 between the diaphragm plate 31 and the casing section 10.

Another casing section 40 is provided, alined with the casing section 10 to provide a chamber 41 in communication with the upper face of the diaphragm 25, as hereinafter explained.

Another casing section 42 is provided, alined with the casing section 40 and the casing section 10, and a wall member 43 is interposed between the casing section 40 and the casing section 42 to separate the chamber 41 from a chamber 44 in the interior of the casing section 42.

The upper end of the casing section 42 is closed by a wall plate 45 which is provided with a hollow tubular extension 46. The upper end of the tubular extension 46 is closed by an upper end cap 47, the cap 47 being held in position by a retaining nut 48 in threaded engagement with the upper end of the tubular extension 46. The wall plate 45 has mounted therein in threaded engagement therewith an adjusting sleeve 49, the outer or free end 50 of which is accessible for turning for adjustment. A lock nut 51 is provided, in engagement with the threaded exterior of the sleeve 49, for locking the sleeve 49 in the desired position of adjustment.

The sleeve 49 is provided on the inner end with an upper spring seating plate 55 with which one end of a spring 56 is in engagement, the other end of the spring 56 being in engagement with a lower spring seat 57, also in the form of a plate.

The lower spring seating plate 57 has one end of a flexible metallic bellows 60 secured thereto in fluid tight relationship, the other end of the bellows 60 being secured in fluid tight relationship to the plate 45.

The lower spring seating plate 57 has a tubular member 61 thereon which extends through an opening 62 in the plate 45 and is provided, at its lower or inner end with a bellows closure plate 63 also secured thereto in fluid tight relationship.

A flexible metallic bellows 64 is provided, secured in fluid tight relationship at one end to the bellows closure plate 63 and at the other end to the interior of the plate 45. The bellows 60 and 64 are preferably matched as to their characteristics, including effective area, prior to assembly.

A chamber 59 is thus provided in the interior of the bellows 60, the opening 62 and the bellows 64.

The upper portion of the tubular member 61 is enlarged, as at 65, so as to serve as a stop for limiting downward movement of the bellows assembly and the plate 45 is provided with a sleeve 66, extending downwardly therefrom, which serves as a stop for engagement by the bellows closure plate 63 for limiting the upward movement of the bellows assembly.

The tubular member 61 is provided with a central opening 67 at the upper end of which an orifice plate 68 is mounted having an orifice 72 therethrough. The central opening 67 is in communication with the chamber 59 in the interior of the bellows 60 through a passageway 69 provided in the tubular member 61.

The chamber 59 in the interior of the bellows 60 and of the bellows 64 is connected by a fluid passageway 70 and a fluid passageway 71 with the chamber 41 and the passageway 70 extends to the discharge side of a restriction 75, the opposite side of the restriction 75 being in communication with the supply connection 11.

As illustrated in Fig. 2 the restriction 75 may comprise a screw plug 76 mounted in the casing section 10 with a central supply port 77 communicating with the supply connection 11 and an inserted tube 78 having the desired bore connected to the passageway 70.

The chamber 23 is also in communication with the chamber 44 through a fluid connection 79.

A plunger 80 is provided, connected to the desired source of motion, which may be derived from an instrument or measuring device. It will be noted that the plunger 80 is relatively long, and in a preferred form is made from a piece of wire of a diameter of the order of $\frac{1}{32}''$. The plunger 80 extends through the orifice 72 and one portion 81, near the lower end and of reduced diameter to provide a shoulder 82 is normally intended to be disposed at or adjacent the orifice plate 68. The maximum diameter of the plunger 80 is, however, slightly less than the diameter of the orifice 72 in the orifice plate 68 so that the plunger 80 is capable of passing through the orifice 72 in either direction without injury to the plunger 80 or to the orifice 72.

The mode of operation will now be pointed out, it being assumed first that the apparatus is in a balanced or normal condition and with the plunger 80 at a particular position for delivering pressure fluid at a regulated level of pressure. Supply fluid under pressure, such as filtered air, is supplied to and through the inlet connection 11 to the chamber 13.

A portion of the fluid, the pressure of which is determined by the positioning of the valve ball 17, is delivered through the delivery passageway 22 to the chamber 23 and therefrom through the passageway 24 to the delivery connection 12.

The pressure effective in the chamber 23 and against the underside of the diaphragm 25, against which the spring 35 is also effective, is also available through the passageway 79 and in the chamber 44 against the exterior of the bellows 64 and the exterior of the bellows closure plate 63.

A part of the supplied fluid available at the inlet connection 11 is delivered through the restriction 75 and through the passageway 70 to the chamber 59, and through the passageways 70 and 71 to the chamber 41.

The pressure of the fluid in the chamber 59 is effective in the interior of the bellows 60 and 64 and the same pressure is effective in the chamber 41 against the upper face of the diaphragm 25. Fluid supplied to the chamber 59 escapes from the bellows assembly through the port in the orifice plate 68 which is controlled by the plunger 80.

Assume now a downward movement of the plunger 80 of a definite distance which moves the shoulder 82 downwardly with respect to the orifice 72 in the orifice plate 68 and permits more fluid to escape from the chamber 59. The pressure in the chamber 59 is thus reduced with a corresponding reduction of the pressure in the chamber 41. The reduction of the pressure in the chamber 41 tends to permit the diaphragm 25 to move upwardly thereby tending to move the valve ball 17 closer to its seat 18 and reducing the pressure effective in the chamber 23. This pressure reduction is also effective in the chamber 44 and permits the bellows assembly to move downwardly until the relationship between the plunger 80 and the opening 72 in the orifice plate 68 is restored to equilibrium.

Upon an upward movement of the plunger 80 of a definite distance, the shoulder 82 is moved upwardly with respect to the orifice 72, so that the plunger reduces the escape of fluid from the chamber 59. The pressure in the chamber 59 is thus increased with a corresponding increase in the pressure in the chamber 41. The increase of the pressure in the chamber 41 tends to permit the diaphragm 25 to move downwardly, thereby tending to move the valve ball 17 further from its seat and increasing the pressure effective in the chamber 23. This pressure increase is also effective in the chamber 44 and tends to force the bellows assembly to move upwardly until the relationship between the plunger 80 and the opening 72 in the orifice plate 68 is restored to equilibrium.

The range of the transmitted pressure, that is, the relationship between the movement of the plunger 80 and the pressure available at the fluid delivery connection 12 is determined by the combined spring rates of the spring 56 and the bellows 60 and 64 and by the effective area of the bellows 60 and 64. The transmitted pressure change acting on the effective area of the bellows 64 is equal to the force change necessary to produce motion of the bellows assembly equal to the motion of the plunger 80. This assumes that for equilibrium conditions there will be a negligible displacement between the plunger 80 and the opening 72 in the orifice plate 68, which is in fact the case. Very little force is required to be asserted on the plunger 80, and the pneumatic control apparatus is, accordingly, suitable for transmitting motion produced by very small force displacement. The reaction on the source of motion is equal to the weight of the plunger 80, which is a constant, less the product of the pressure effective in the chamber 59 and the cross sectional area of the plunger 80. The pressure effective at the chamber 59 varies with different values of the transmitted pressure, but, by reason of the spring 35 effective on the lower side of the diaphragm 25, a constant differential of predetermined value is provided between the pressure effective in the chamber 41 and the pressure available in the chamber 23 for transmission. The use of a pressure in the chamber 59 which is higher than the transmitted pressure enhances the linearity of the system.

The positioning of the orifice plate 68 with respect to the plunger 80 for zero adjustment may be readily effected by turning the sleeve 49 to the desired position to vary the effect of the spring 56 on the upper spring seating plate 57 and therethrough onto the bellows assembly.

The diaphragm 25, by its positioning of the port 30 with respect to the upper end of the valve rod 19, provides for an automatic bleed for exhausting excess fluid through the pervious center of the diaphragm 25 and through the passageway 27 to atmosphere.

I claim:

1. In pneumatic control apparatus, a movable bellows assembly having an interior chamber, means for applying a fluid pressure against an exterior portion of said assembly, means for supplying pressure fluid to said interior chamber, and means for controlling the discharge of fluid from said chamber comprising a member having an orifice carried by said assembly and a control member for varying the effective area of said orifice movable in said orifice and having a portion of reduced diameter normally disposed in said orifice.

2. In pneumatic control apparatus, a movable bellows assembly having an interior chamber, means for applying a fluid pressure against an exterior portion of said assembly, means including a restriction for supplying pressure fluid to said interior chamber, and means for controlling the discharge of fluid from said chamber comprising a member having an orifice carried by said assembly and a control rod for varying the effective area of the orifice movable in said orifice and having a portion of reduced diameter normally disposed in said orifice.

3. In pneumatic control apparatus, a movable bellows assembly having an interior chamber, means for applying a pressure fluid against an exterior portion of said assembly, means for supplying pressure fluid to said interior chamber, and means for controlling the discharge of fluid from said chamber comprising a member having an orifice carried by said assembly and a control member for varying the effective area of said orifice, said control member having a throttling portion freely movable through said orifice and a support for said throttling portion of reduced cross section normally disposed within said orifice.

4. In pneumatic control apparatus, a movable bellows assembly having an interior chamber, means for applying a fluid pressure against an exterior portion of said assembly, means for supplying pressure fluid to said interior chamber, and means for controlling the discharge of fluid from said chamber comprising a member having an orifice carried by said assembly and a control rod for varying the effective area of the orifice having a portion of reduced cross section movable in said orifice, said rod being smaller in size than said orifice and freely movable therethrough.

5. In pneumatic control apparatus, a movable bellows assembly having an interior chamber, means for applying a fluid pressure against an exterior portion of said assembly, means for supplying pressure fluid to said interior chamber, and means for controlling the discharge of fluid from said chamber comprising an orifice plate carried by said assembly having an orifice and a control rod for varying the effective area of the orifice of a size less than that of said orifice and having a portion of reduced cross section normally disposed in said orifice.

6. In pneumatic control apparatus, a support, a pair of opposed bellows closed at their outer ends and carried at their inner ends on said support and having an interior chamber, a connecting member for the outer ends of said bellows, means for supplying pressure fluid to the interior of said chamber, means for applying fluid pressure against an exterior portion of said bellows, and valve means for controlling the discharge of fluid from said chamber.

7. In pneumatic control apparatus, a support, a pair of opposed bellows closed at their outer ends and mounted at their inner ends on said support and having an interior chamber, a connecting member for the outer ends of said bellows, means for supplying pressure fluid to the interior of said chamber, means for applying fluid pressure against an exterior portion of said bellows, and valve means for controlling the discharge of fluid from said chamber, said valve means including a member having an orifice and a movable control member for varying the effective area of said orifice.

8. In pneumatic control apparatus, a pair of spaced pressure responsive members connected for movement together and having a chamber therebetween, a fluid connection for supplying pressure fluid to said chamber, means for applying fluid under pressure against an exterior portion of one of said members, the other of said pressure responsive members having a discharge opening therein, and a valve member movable with respect to said opening for determining the discharge of fluid from said chamber through said opening.

9. In pneumatic control apparatus, a support, a pair of spaced movable wall members carried by said support and providing with said support an interior chamber, a connection between said wall members for effecting simultaneous movement thereof, a fluid connection for supplying fluid under pressure to said chamber, valve means for exhausting fluid from said chamber, said valve means including a valve member and an opening in one of said wall members relatively movable with respect to each other, and a fluid connection for applying fluid under pressure against an exterior face of one of said wall members.

COLEMAN B. MOORE.

REFERENCES CITED

The following references are of record in the file of this patent:

UNITED STATES PATENTS

| Number | Name | Date |
| --- | --- | --- |
| 2,356,970 | Brockett | Aug. 29, 1944 |
| 2,433,577 | Poole | Dec. 30, 1947 |